US012064793B2

(12) United States Patent
Aniulis

(10) Patent No.: US 12,064,793 B2
(45) Date of Patent: Aug. 20, 2024

(54) STABLE VORTEX FUME HOOD CONTROL DEVICE

(71) Applicant: Johnson Controls Tyco IP Holdings LLP, Milwaukee, WI (US)

(72) Inventor: Aurimas Aniulis, Atlanta, GA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 142 days.

(21) Appl. No.: 17/684,246

(22) Filed: Mar. 1, 2022

(65) Prior Publication Data

US 2023/0278081 A1 Sep. 7, 2023

(51) Int. Cl.
*B08B 15/02* (2006.01)

(52) U.S. Cl.
CPC ........ *B08B 15/023* (2013.01); *B08B 2215/00* (2013.01)

(58) Field of Classification Search
None
See application file for complete search history.

(56) References Cited

U.S. PATENT DOCUMENTS 4,177,718 A * 12/1979 Grow .................... B08B 15/023 55/DIG. 15
4,377,969 A * 3/1983 Nelson .................. B08B 15/023 454/59
4,706,553 A 11/1987 Sharp et al.
4,741,257 A 5/1988 Wiggin et al.
4,773,311 A 9/1988 Sharp
4,934,256 A * 6/1990 Moss .................... B08B 15/023 454/61
5,115,728 A 5/1992 Ahmed et al.
5,205,783 A * 4/1993 Dieckert ............... B08B 15/023 454/238
5,385,505 A 1/1995 Sharp et al.
(Continued)

FOREIGN PATENT DOCUMENTS

DE 69814036 T2 * 1/1997
EP 0954390 B1 * 1/1998
JP 2007061750 A * 3/2007

*Primary Examiner* — Joseph A Dillon, Jr.
(74) *Attorney, Agent, or Firm* — Foley & Lardner LLP

(57) ABSTRACT

A fume hood control system includes a fume food. The fume hood includes a first baffle, a sash and a hood enclosure positioned within an environment. The hood enclosure includes a plurality of sidewalls forming a work chamber, a first aperture configured to permit an airflow between the environment and the work chamber, and a second aperture configured to permit the airflow between the work chamber. The sash is configured to at least partially cover the first aperture. The first baffle is configured to direct a path of the airflow within the work chamber. The first baffle is transitionable between a first number of positions. The fume hood control system includes a controller configured to determine, via a sash sensor, a current position of the sash. The controller is further configured to determine, via a baffle position sensor, a current position of the first baffle. The controller is further configured to control the operation of the first baffle to transition between the current position of the first baffle and an updated position of the first baffle in response to the current position of the sash, the current position of the first baffle, and one or more pressure measurements.

20 Claims, 6 Drawing Sheets

(56) References Cited

U.S. PATENT DOCUMENTS

| | | | | |
|---|---|---|---|---|
| 5,415,583 | A | 5/1995 | Brandt | |
| 5,545,086 | A | 8/1996 | Sharp et al. | |
| 5,810,657 | A | 9/1998 | Pariseau | |
| 5,946,221 | A * | 8/1999 | Fish, Jr. | B08B 15/023 454/239 |
| 5,988,860 | A | 11/1999 | Hefferen et al. | |
| 6,154,686 | A * | 11/2000 | Hefferen | B08B 15/023 700/277 |
| 6,272,399 | B1 * | 8/2001 | Fish, Jr. | F24F 11/74 454/239 |
| 6,692,346 | B2 * | 2/2004 | Bastian | B08B 15/023 454/59 |
| 6,914,532 | B2 * | 7/2005 | Crooks | F24F 11/74 340/506 |
| 6,923,715 | B2 | 8/2005 | Kreuzer et al. | |
| 7,470,176 | B2 * | 12/2008 | Morris | B08B 15/023 454/61 |
| 9,541,378 | B2 * | 1/2017 | Charles | G01B 11/002 |
| 9,945,571 | B2 | 4/2018 | Omura et al. | |
| 10,109,071 | B2 * | 10/2018 | Charles | B08B 15/023 |
| RE48,081 | E * | 7/2020 | Donohue | F24F 11/74 |
| 10,755,555 | B2 | 8/2020 | Norton et al. | |
| 10,917,740 | B1 | 2/2021 | Scott et al. | |
| 11,801,538 | B2 | 10/2023 | Desrochers | |
| 2004/0014417 | A1 | 1/2004 | Katz | |
| 2013/0233411 | A1 * | 9/2013 | Donohue | F24F 11/74 137/502 |
| 2014/0094106 | A1 * | 4/2014 | McIlhany | F24F 11/52 356/628 |
| 2014/0120819 | A1 * | 5/2014 | Stakutis | F24F 3/163 454/56 |
| 2023/0278082 | A1 * | 9/2023 | Aniulis | F24F 11/74 700/61 |

* cited by examiner

STABLE VORTEX FUME HOOD CONTROL DEVICE

BACKGROUND

The present disclosure relates generally to fume hoods. More specifically, the present disclosure relates to controlling the position of baffles for fume hoods.

A fume hood, also known as a fume cupboard, is a working environment with localized ventilation that is frequently used in workplaces such as laboratories. The purpose of a fume hood is to contain (or minimize the leakage of) gases, vapors, and other airborne contaminants from the interior of the fume hood into the immediate surrounding environment. A user, such as a laboratory technician, may work with potentially harmful biological or chemical materials that are placed inside a fume hood, and the immediate surrounding environment of the fume hood may be the user's breathing area. Accordingly, fume hood safety is of paramount importance in order to protect deadly harm the users. A ventilation system may draw air from the technician's surrounding environment, such as a laboratory, into a fume hood, and then safely vent the gases into another location.

Some designs of fume hoods feature a sash or sash window in the front opening of the fume hood. The sash can be raised to allow easier access to the materials and laboratory equipment contained within the fume hood. The sash can also be lowered when access is not required to further minimize the potential for materials to leak into the surrounding environment. Typically, the sash does not close fully, but instead maintains a narrow opening. This enables the ventilation system to continue to operate.

Some designs of fume hoods feature one or more baffles within the fume hood to direct airflow through the fume hood.

SUMMARY

At least one embodiment relates to a fume hood control system for a fume hood. The fume hood includes a first baffle, a sash and a hood enclosure positioned within an environment. The hood enclosure includes a plurality of sidewalls forming a work chamber, a first aperture configured to permit an airflow between the environment and the work chamber, and a second aperture configured to permit the airflow between the work chamber. The sash is configured to at least partially cover the first aperture. The first baffle is configured to direct a path of the airflow within the work chamber. The first baffle is transitionable between a first number of positions. The fume hood control system includes a controller configured to determine, via a sash sensor, a current position of the sash. The controller is further configured to determine, via a baffle position sensor, a current position of the first baffle. The controller is further configured to control the operation of the first baffle to transition between the current position of the first baffle and an updated position of the first baffle in response to the current position of the sash, the current position of the first baffle, and one or more pressure measurements.

In at least one embodiment, a fume hood system is provided. The fume hood system includes a hood enclosure positioned within an environment. The hood enclosure includes a number of sidewalls forming a work chamber, a first aperture configured to permit airflow between the environment and the work chamber, and a second aperture configured to permit airflow between the work chamber and an exhaust valve. The fume hood system further includes a sash coupled to the first aperture and a baffle configured to direct a path of the airflow within the work chamber. The baffle is transitionable between a number of positions. The fume hood system further includes a sash sensor coupled to one of the number of sidewalls. The sash sensor is configured to measure a current position of the sash. The fume hood system further includes a first pressure sensor and a second pressure sensor. The first pressure sensor is configured to measure a pressure within the work chamber. The second pressure sensor is configured to measure a pressure of the environment. The fume hood system further includes a controller. The controller is coupled to the baffle, the pressure sensor, and the sash sensor. The controller is configured to determine, via the sash sensor, the current position of the sash. The controller is further configured to determine a current position of the baffle. The controller is further configured to receive one or more measurements from the first pressure sensor. The controller is further configured to receive one or more measurements from the second pressure sensor. The controller is further configured to control the operation of the baffle to transition between the current position of baffle and an updated position of the baffle based the current position of the sash, the current position of the baffle, the one or more measurements received from the first pressure sensor, and the one or more measurements received from the second pressure sensor.

In at least one embodiment, a method of controlling a baffle of a fume hood is provided. The method includes providing a sash and providing a first baffle configured to direct a path of an airflow. The baffle is transitionable between a first number of positions. The method further includes determining, via a controller, a current position of the baffle, measuring a current position of the sash with a sash sensor, sending, via the sash sensor, the current position of the sash to the controller, measuring a first pressure measurement within the fume hood with a first pressure sensor, sending, via the first pressure sensor, the first pressure to the controller, measuring a second pressure measurement outside the fume hood with a second pressure sensor, sending, via the second pressure sensor, the second pressure to the controller, and controlling, via the controller, the operation of the baffle to transition between the current position of the baffle and an updated position of the baffle based on the current position of the sash, the current position of the baffle, the first pressure measurement, and the second pressure measurement.

In at least one embodiment, a controller for controlling a position of a baffle in a fume hood system is provided. The controller includes one or more processors and a memory. The one or more processors are configured to determine, via a position sensor coupled to the controller, a current position of a sash coupled to the fume hood, determine, via a first actuator coupled to the controller, a current position of a first baffle coupled to the fume hood, the first baffle coupled to the first actuator and configured to direct a path of airflow within the fume hood, determine, via a differential pressure sensor coupled to the controller, a difference in pressure between a first pressure outside the fume hood and a second pressure within the fume hood, and control the operation of the first baffle to transition between the current position of the first baffle and an updated position of the first baffle based on the current position of the first baffle and the difference in pressure.

This summary is illustrative only and should not be regarded as limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
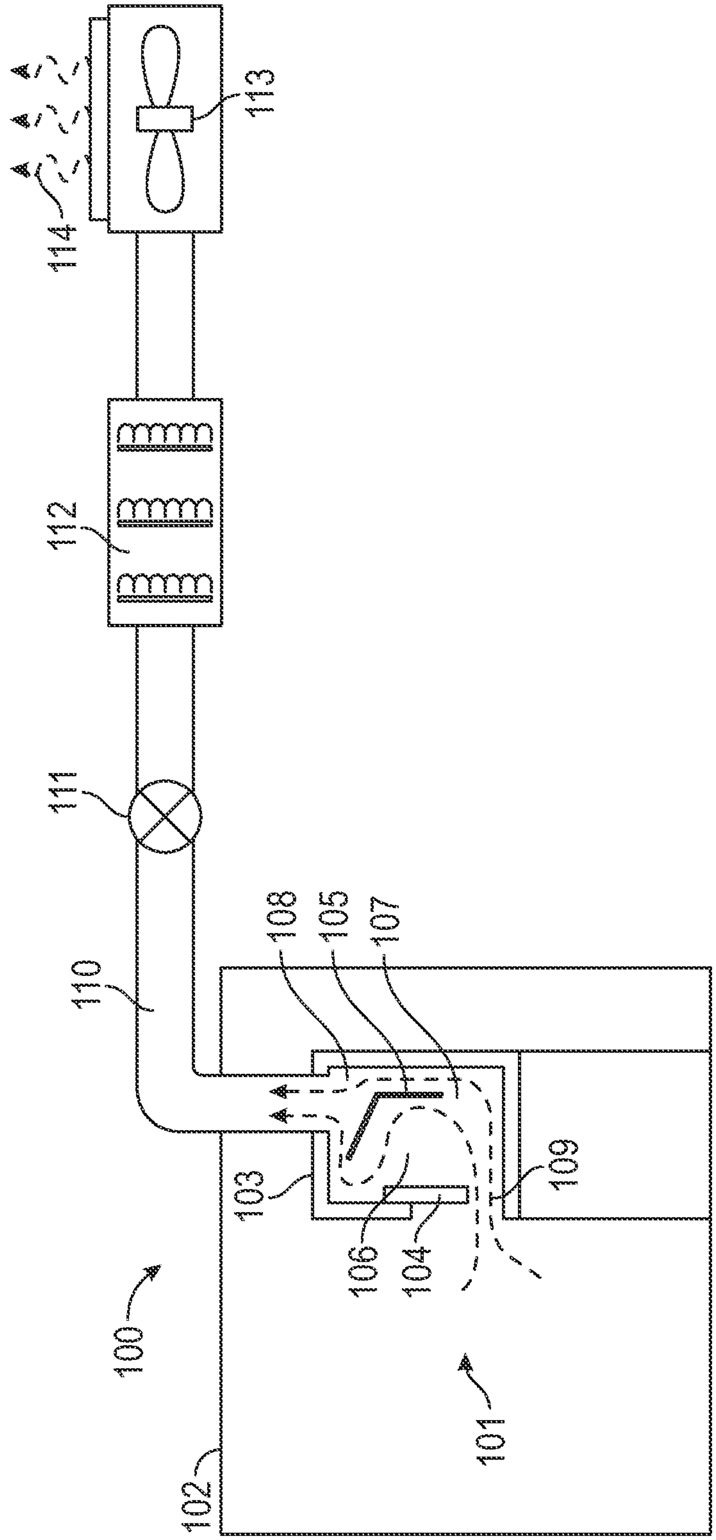
FIG. 1 is a block diagram showing a ventilation system for a fume hood, according to one embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The present disclosure relates to fume hoods, including, but not limited to, dynamically maintaining a stable vortex formed by airflow within a fume hood. In order to contain airborne contaminants within the interior of the fume hood, many systems use a ventilation system to draw air from a surrounding environment of the fume hood, through an interior of the fume hood, and to another location. In this way, contaminants produced within the fume hood are directed by an airflow within the fume hood to remain in the interior of the fume hood and ultimately be drawn out of the interior of the fume hood into the other location.

In a constant air volume (CAV) fume hood, the volume of air that is drawn through the fume hood remains constant. When the sash is lowered, the size of the opening into the fume hood (e.g., the sash opening) is reduced. If the volumetric flow rate of air remains constant, then the velocity of the air must increase as the size of the opening reduces. This increase in air velocity is often not necessary to maintain the efficacy of the fume hood, and so may lead to inefficiency and wasted energy. In some systems using a variable air volume (VAV) fume hood, the position of the sash is monitored, and the volumetric flow rate of air being drawn through the fume hood is adjusted in response. The volumetric flow rate of air being drawn through the fume hood may be adjusted by a variable exhaust valve, while fans drawing air through the fume hood remain operating at a constant speed. When the sash is lowered, the exhaust valve may partially close to lower the volumetric flow rate of air being drawn through the fume hood. This maintains the velocity of air at the sash opening and increases efficiency.

Previously, one of the measures used to verify operations within the fume hood was the feet per minute (FPM or "face velocity") of air moving through the sash opening where the where the user interacts with the fume hood and performs various operations within the fume hood. It has since been documented in the American Society of Heating, Refrigerating and Air-Conditioning Engineers (ASHRAE) code that face velocity is no longer a measure of fume hood safety. Rather, containment of air particles within the fume hood has been documented as the proper measure for verifying operations within the fume hood. Accordingly, many systems verify containment via face velocity. For example, many systems verify containment by measuring a face velocity of 100 FPM. However, face velocity in general does not account for dynamic changes occurring within the fume hood. For instance, the activation of a burner (e.g., a "Bunsen Burner") may provide a significant change in pressure within the fume hood that jeopardizes the safe containment of air particles, even though the measured FPM remains at 100. Further, the placement of various equipment in the fume hood may invoke turbulence in the air moving through the fume hood, thereby disrupting safe containment while, again, the measured FPM remains at 100. Therefore, there is a need for a system that actively measures changing conditions within the fume hood and dynamically adjusts the airflow through the fume hood such that containment is properly maintained.

Various embodiment disclosed herein relate to a mechanism that monitors conditions pertaining to maintaining a stable vortex of air and dynamically controls the position of one or more aerodynamic baffles in a fume hood, thereby maintaining the stable vortex of air inside the working area of the fume hood which continuously absorbs and ejects vapors while simultaneously pulling in fresh air. The one or more baffles may be controlled to change position in order to respond to changes in conditions regarding the fume food, such as raising or lowering the sash. The monitoring and dynamic control of the stable vortex within the fume hood is a significantly more effective method to ensure containment in fume hoods as opposed to face velocity. Moreover, maintaining a stable vortex within the fume hood may achieve containment without the need for a face velocity of 100 FPM, thereby allowing for reductions in energy consumption and improved efficiency. In some embodiments disclosed herein, the dynamic control system further leverages control over an exhaust valve to maintain the stable vortex of air.

Various embodiments disclosed herein relate to a mechanism for dynamically controlling the position of one or more baffles in a fume hood, thereby maintaining a stable vortex optimized for safe containment.

Turning now to FIG. 1, a block diagram of a ventilation system 100 is shown, according to one embodiment. The ventilation system 100 is provided within a room 102 made up of a plurality of walls (e.g. a laboratory), and includes a fume hood 101, a ductwork 110 (e.g. an air duct, conduit, vent, etc.), an exhaust valve 111, a filter 112, a fan 113, and a different location 114 (e.g. the roof of a building, air duct system, etc.). The fume hood 101 is positioned within the room 102 and includes an upper housing 103 (e.g. a first or upper unit or enclosure, a work chamber, etc.), a sash 104 (e.g. a panel member, window, sliding door, etc.), an opening 109, an upper chamber region 108, and a baffle assembly (e.g., one or more baffles) 105. The fan 113 creates a negative pressure in the ductwork 110, which draws air out of the upper chamber region 108. This in turn creates negative pressure in the upper chamber region 108 and causes air to be drawn into the fume hood 101 through the opening 109, into a lower chamber region 107, and to the upper chamber region 108, either directly (e.g., through a narrow region behind the baffle assembly 105) or through a main chamber region 106 (e.g., in front of the baffle assembly 105). Air flowing through the opening 109, the lower chamber region 107, the main chamber region 106, and the upper chamber region 108 may be directed by the baffle assembly 105. As described in greater detail below in regards to FIGS. 3 and 4, the air, as directed by the baffle assembly 105, may form a vortex in the main chamber region 106. The sash 109 at least partially covers a front aperture of the upper housing 103, thus forming the opening 109. The size of the opening 109 is determined by the raising and lowering of the sash 104. The air that passes through the ductwork 110 and the exhaust valve 111 may pass through one or more filters, such as the filter 112, before being vented to the different location 114. The exhaust valve 111 may be coupled to an exhaust valve actuator 550, as described in greater detail below in regards to FIGS. 5A and 5B. The fume hood 101 may be, or include any of the features of, any of the fume hoods disclosed herein.

Figure 2:
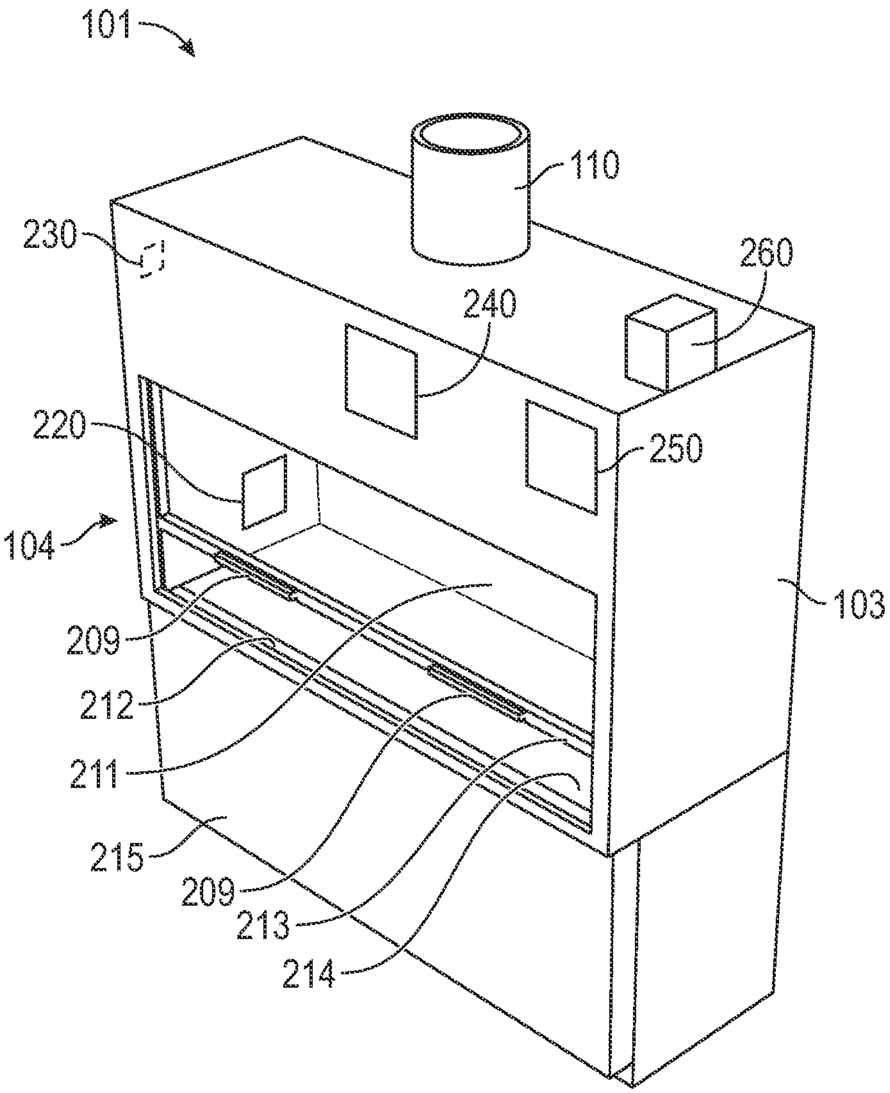
FIG. 2 is a front perspective view of a fume hood, according to one embodiment.

Referring now to FIG. 2 with additional reference to FIG. 1, the fume hood 101 depicted in FIG. 1 is shown in greater detail, according to one embodiment. The fume hood 101 includes the upper housing 103, a work surface 214, the sash 104, and a lower unit 215 (e.g. a second or lower unit or enclosure, etc.). The upper housing 103 is coupled to the ductwork 110 through which air may travel (e.g., be drawn up or down) to or from within the fume hood 101. The lower unit 215 may include storage areas, such as cupboards or drawers. The sash 104 includes handles 209, a frame 213, and a glass window 211. According to various embodiments, the sash may take any appropriate size and/or shape and be made of any appropriate material for covering an opening of a fume hood. During use, a person may raise the sash 104 in order to gain access to the work surface 214, onto which the person may place various chemical and/or biological materials, according to one embodiment. When not in use, a person may lower the sash 104, but still leave a narrow opening 212, so that the ductwork 110 can continue to operate. As suggested above, in a system using a variable air volume (VAV) fume hood, the position of the sash is monitored, and the volumetric flow rate of air being drawn through the fume hood is adjusted in response. The volumetric flow rate of air being drawn through the fume hood may be adjusted by a variable exhaust valve, while fans drawing air through the fume hood remain operating at a constant speed. When the sash is lowered, the exhaust valve may partially close to lower the volumetric flow rate of air being drawn through the fume hood. This maintains the velocity of air at the sash opening and increases efficiency in some embodiments.

In some embodiments, the fume hood 101 further includes a controller 260 coupled to the upper housing 103 and a first pressure sensor 220 coupled to the upper housing 103. The first (e.g., interior) pressure sensor 220 may measure an air pressure within the upper housing 103. For example, the first pressure sensor 220 may measure the air pressure in the main chamber region 106 described above in regards to FIG. 1. The fume hood 101 further includes a second (e.g., exterior, reference, etc.) pressure sensor 250 coupled to the upper housing 103. The second pressure sensor 250 may measure an air pressure outside the upper housing 103. For example, the second pressure sensor 250 may measure the air pressure in the room 102. Accordingly, the first pressure sensor 220 and the second pressure sensor 250 may act together to measure the difference in air pressure between a region inside the upper housing 103 and a region outside the upper housing 103. In some embodiments, the first pressure sensor 220 and the second pressure sensor 250 operate in combination as a differential pressure sensor configured to measure the difference between the air pressure within the upper housing 103 and the air pressure in the room 102 (rather than two sensors providing measurements independently, as shown). The first pressure sensor 220 and the second pressure sensor 250 are each communicably coupled to the controller 260. The controller 260 may direct dynamic adjustments to one or more components of the fume hood 101 in order to maintain containment, as described in further detail below. In some embodiments, the fume hood 101 further includes a user display 240 coupled to the upper housing. The user display 240, as described in greater detail below, may provide the user with a status of the fume hood 101 or various warning messages regarding unsafe conditions.

In some embodiments, the fume hood 101 further includes a sash position sensor 230. The sash position sensor 230 may measure the position of the sash 104. The sash position sensor 230 may be configured to sense condition data (e.g. position, movement, speed, etc.) associated with a sash and/or the surrounding environment, such as the sash 104 depicted in FIG. 1, and communicate the condition data of the sash 104 to the controller 260. In some embodiments, the sash position sensor 230 is an ultrasonic or laser sensor that detects proximity, a Bluetooth® low energy (BLE) sensor that detects proximity of a BLE tag, or some other type of sensor.

In some embodiments, the controller 260 uses information provided by the sash position sensor 230 to determine the current position of the sash 104. This information is transmitted to a variable air volume (VAV) controller to adjust the flow rate in response to the position of the sash 104. In other embodiments, the controller 260 may use information provided by a VAV controller, or other sensors in the fume hood 101, to determine the position of the sash 104. In some embodiments, the controller 260 is configured to communicate using a wireless communication protocol, including but not limited to, Wi-Fi (e.g. 802.11x), Wi-Max, cellular (e.g. 3G, 4G, LTE, CDMA, etc.), LoRa, Zigbee, Zigbee Pro, Bluetooth, Bluetooth Low Energy (BLE), Near Field Communication (NFC), Z-Wave, 6LoWPAN, Thread, RFID, and other applicable wireless protocols In some embodiments, the handles 209 feature force switches that determine when a handle is being pulled upwards or pushed downwards. The state of these switches may indicate to the controller 260 if a person is attempting to raise or lower the sash 104, and be used as an alternative to, or in conjunction with the sash position sensor 230 to determine the position of the sash 104. The measured position of the sash 104 may be used to determine a size of the opening 109 described above in regards to FIG. 1.

Figure 3:
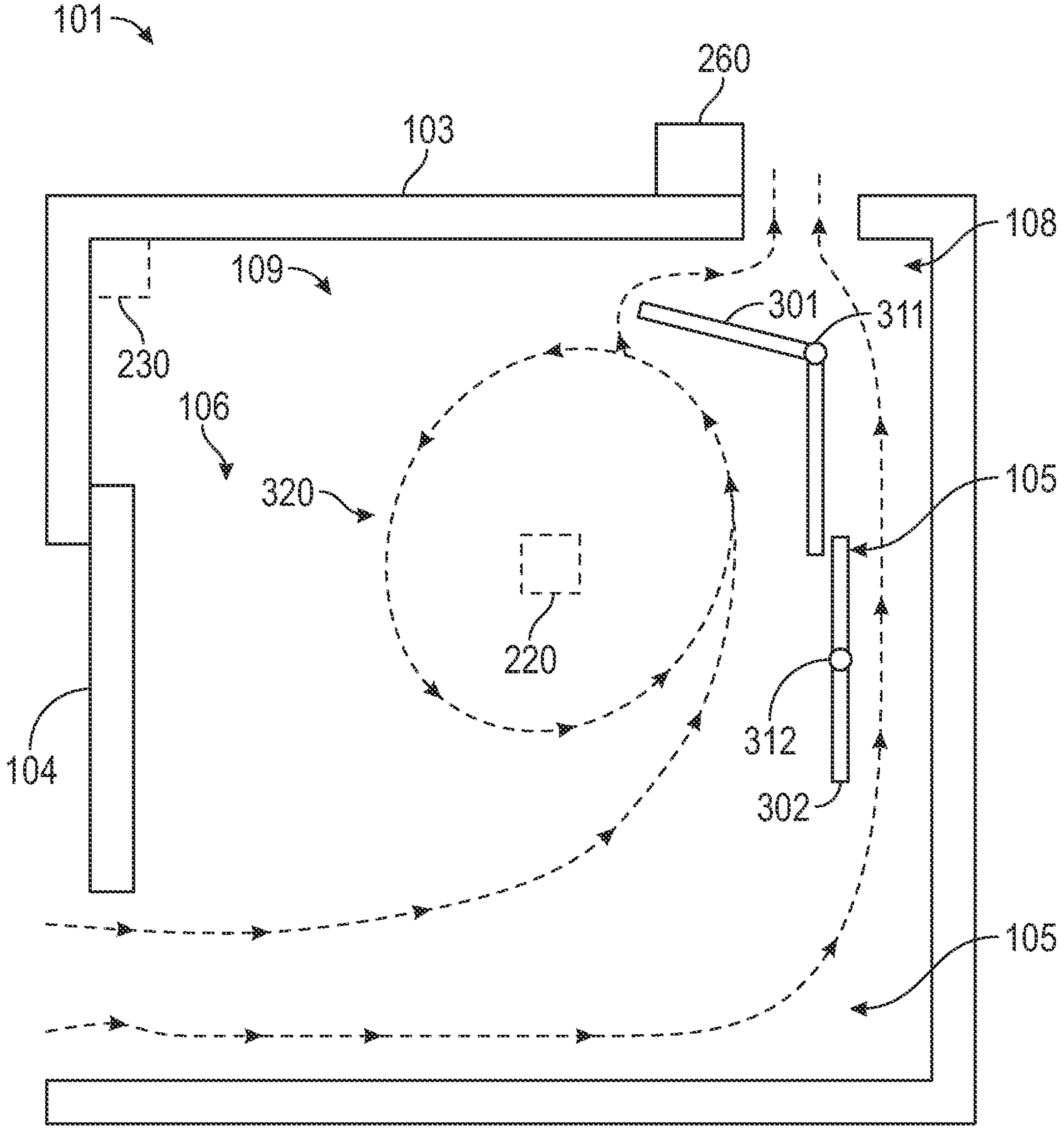
FIG. 3 is a side cross-sectional view of a fume hood showing an air path interacting with baffles, according to one embodiment.
Figure 4:
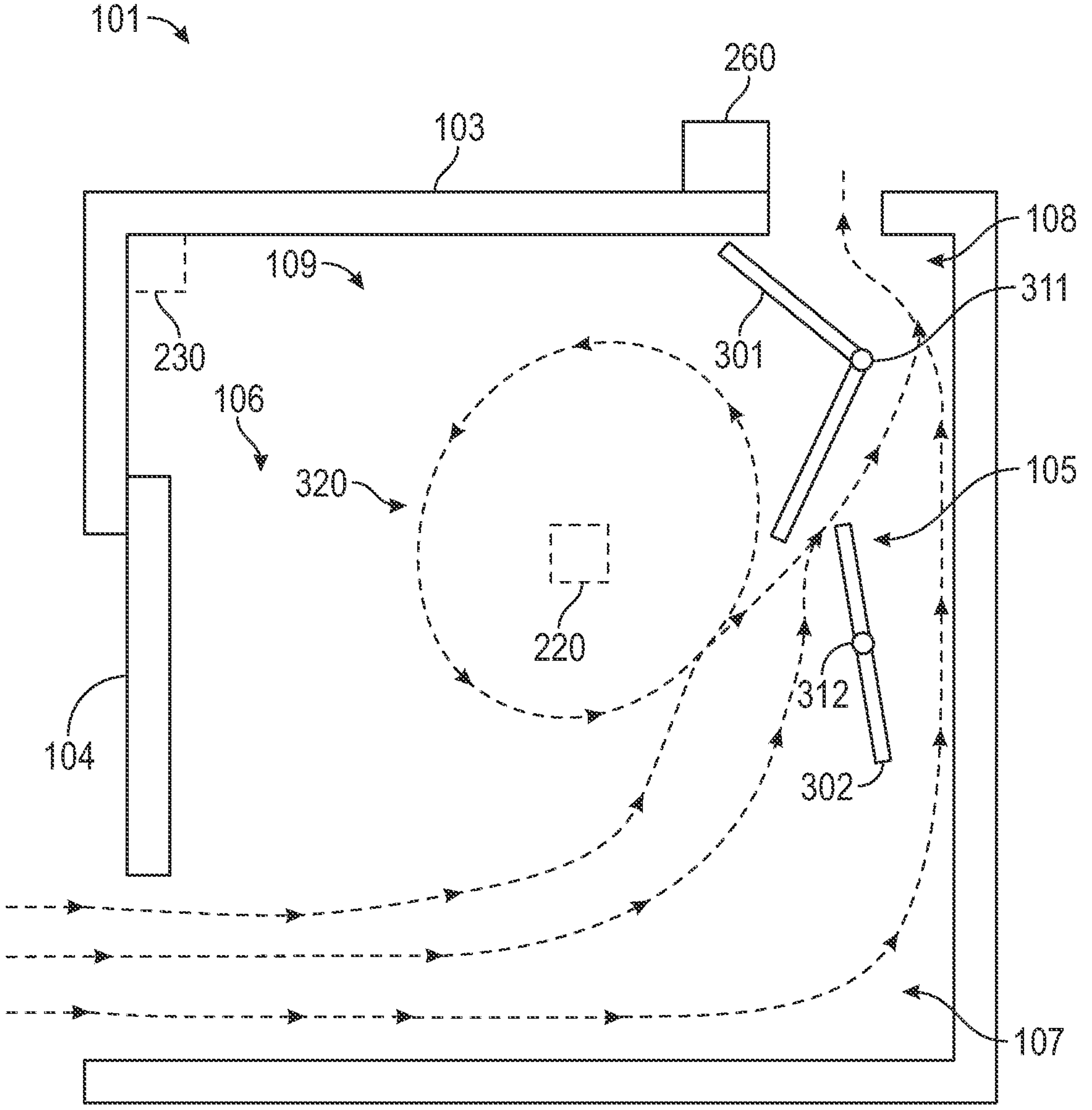
FIG. 4 is a side cross-sectional view of a fume hood showing an updated air path interacting with baffles in an updated position, according to one embodiment.

Referring now to FIG. 3, with additional reference to FIGS. 1 and 2, a cross-sectional view of the fume hood 101 is shown, according to one embodiment. As shown, the baffle assembly 105 includes a first baffle 301 and a second baffle 302. The first baffle 301 is coupled to a first actuator 311 and the second baffle 302 is coupled to a second actuator 312. The first actuator 311 is configured to rotate (e.g., move, translate, displace, etc.) the first baffle 301 and the second actuator 312 is configured to rotate the second baffle 312. As shown in FIG. 4, the first baffle 301 and second baffle 302 can thus be repositioned to affect the airflow through the fume hood 101.

As shown, air flowing through the fume hood 101 is distributed on a path that creates a vortex 320. As suggested above, the vortex 320 may be necessary for optimal safety conditions within the upper housing 103. Generally, the vortex 320 is shaped as a result of the interior shape of the upper housing 103 and the positions of the baffle assembly 105.

In some embodiments, the pressure sensor 220 is located as shown, within the main chamber region 106. However, it should be appreciated to one skilled in the art that the pressure sensor 220 may be located in any number of locations on and/or within the upper housing 103 to detect a pressure measurement within the work chamber, including, but not limited to, the lower chamber region 107, the main chamber region 106, and the upper chamber region 108.

Referring now to FIG. 4, with additional references to FIGS. 1-3, a cross sectional view of the fume hood 101 is shown, according to one embodiment. As shown, and compared to the baffle assembly depicted in FIG. 3, the baffle assembly 105 as depicted in FIG. 4 has been updated. Specifically, the first baffle 301 has been rotated by the actuator 311 about an axis formed by the actuator 311 and the second baffle 312 has been rotated by the second actuator 312 about an axis formed by the second actuator 312. Updates to the position of the baffle assembly 105 may be responsive to any number of changes to the conditions within the fume hood 101. As a first example, the position of the sash 104 may change. The sash 104 may be raised, resulting in the opening 109 depicted in FIG. 1; the sash may be lowered, resulting in the narrow opening 212 depicted in FIG. 2; or the sash 104 may be positioned at any translational point with respect to the fume hood 101 that alters, at least temporarily, the amount of air traveling into the fume hood 104. Although not shown, though suggested above, the sash 104 may be configured to articulate an opening in the fume hood 101 in any number of manners aside from vertical translation including, but not limited to, horizontal translation, the opening of doors on the sash 104, etc. As a second example, cross drafts arriving from the room 102, may change the conditions within the fume hood 101. As a third example, various work procedures may change the conditions within the fume hood 101 (e.g., a user standing too close to the opening 109). As a fourth example, internal obstructions, such as various work equipment, may change the conditions within the fume hood 101. As a fifth example, chemicals and/or vapors produced by the work procedures may change the conditions within the fume hood 101. As a sixth example, in a system where the exhaust valve 111 is operated in immediate response to a changing position of the sash 104, as described in greater detail below in regards to FIG. 5B, updates to the amount of air being drawn out of the fume hood 101 may not occur quickly enough in response to a change in position of the sash 104 to maintain the conditions within the fume hood 101, and therefore an updated position of the baffle assembly 105 may be required to ensure safety. Accordingly, it should be appreciated by one of skill in the art that any number of instances could cause dynamic changes within the fume hood 101. Therefore, the dynamic system of the present disclosure may offer an optimized solution to reacting to such changed conditions in order to ensure a safe working environment.

In some embodiments, the first actuator 301 and/or the second actuator 302 are stepper motors. In other embodiments, the first actuator 301 and the second actuator 302 are another type of motor. The first actuator 301 and/or the second actuator 302 may use electricity supplied by mains power. The mains power may be converted through use of a transformer and/or AC to DC converter to achieve the electrical supply that the first actuator 301 and/or the second actuator 302 require. The first actuator 301 and/or the second actuator 302 may be powered by a battery, or a supplemental battery may be used in addition to mains power. Where either or both of the first actuator 301 and the second actuator 302 are powered by a battery, the first actuator 301 and/or the second actuator 302 are able to control the rotational position the first baffle 311 and/or the second baffle 312 of a sash in the event of a power failure (the mains power, for example). Where the supplemental battery is rechargeable, it may be recharged by mains power.

Figure 5A:
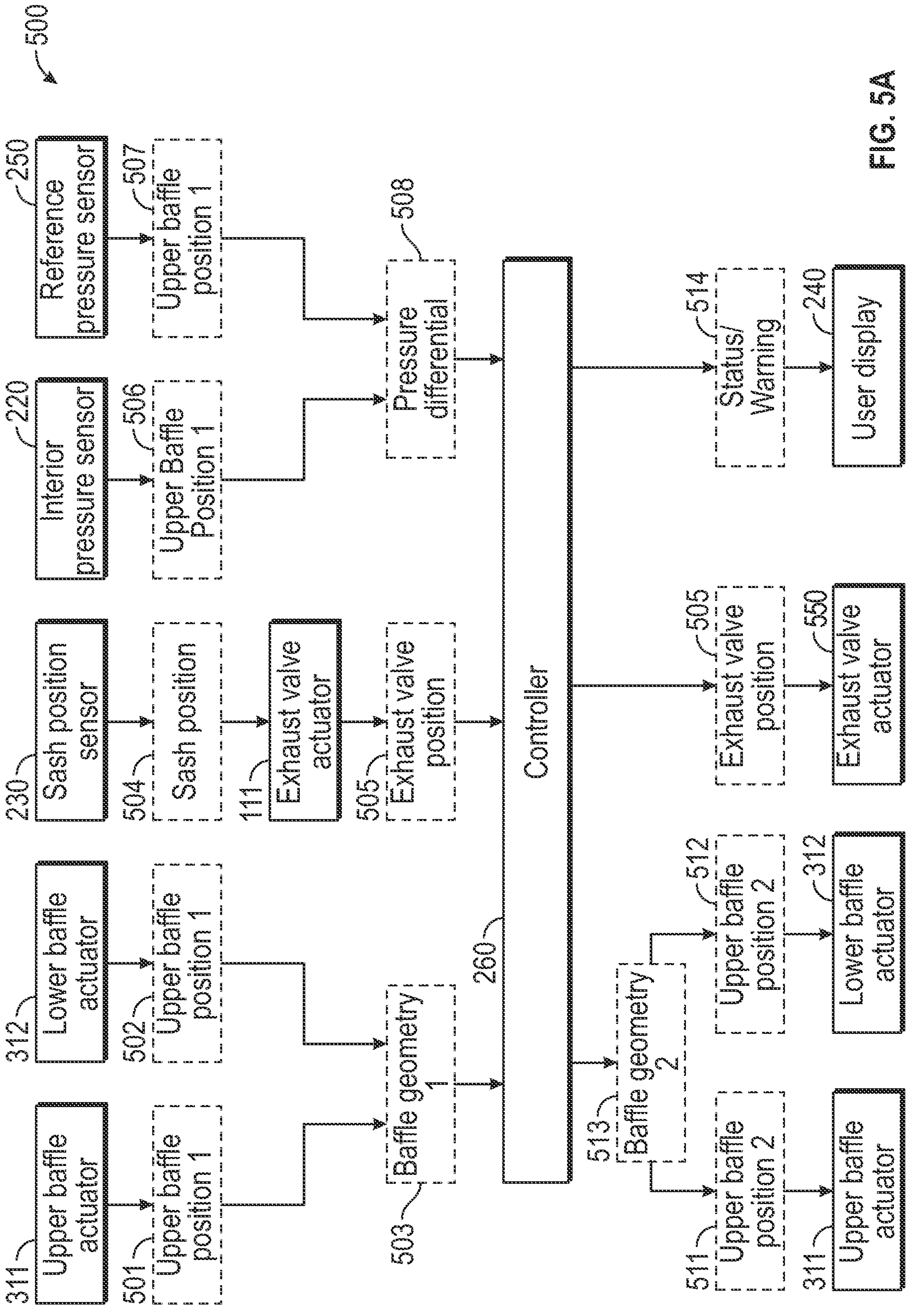
FIG. 5A is a flow diagram showing a controller controlling the position of baffles of a fume hood and a display device, according to one embodiment.
Figure 5B:
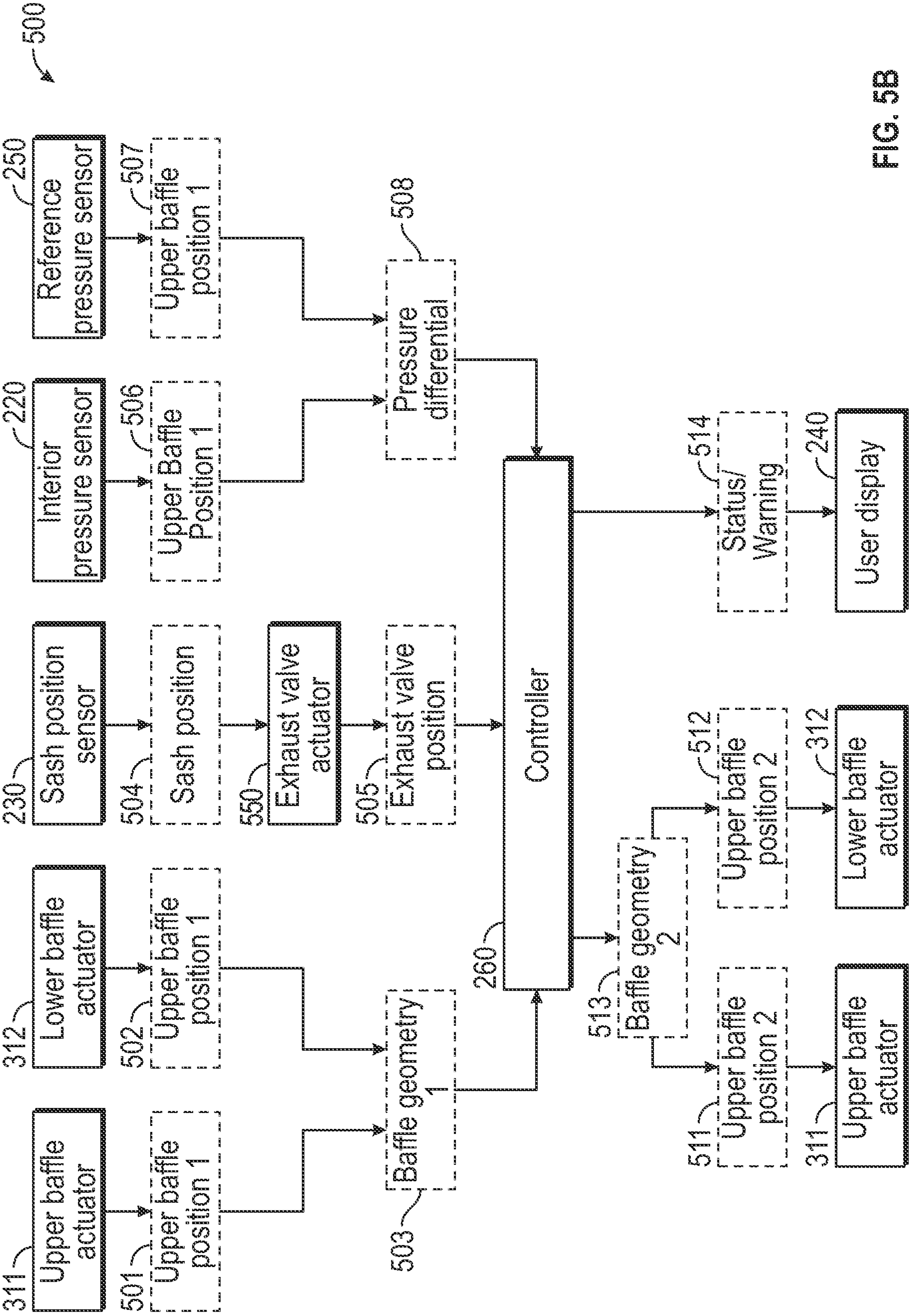
FIG. 5B is a flow diagram showing a controller controlling the position of baffles of a fume hood, a display device, and an exhaust valve, according to one embodiment.

Referring now to FIGS. 5A and 5B, with additional reference to FIGS. 1, 2, and 4, a flow 500 for controlling the position of the baffle assembly 105 is shown, according to some embodiments. FIG. 5A depicts the controller 260 interpreting a current (e.g., previous, original, measured) baffle geometry 503, a sash position 504, and a pressure differential 508 to determine an adjusted (e.g., updated, optimized, changed, re-articulated, etc.) baffle geometry 513, an exhaust valve position 505, and a status and/or warning message 514. As illustrated in FIGS. 3 and 4, the baffle geometry 503 may include an upper baffle position (e.g., a rotational position) 511 and a lower baffle position 512, which are manipulated to direct the airflow through the upper housing 103. The exhaust valve position 505, as described in greater detail below in regards to FIG. 5B, may be provided to the exhaust valve actuator 511 to articulate an orientation of the exhaust valve, thereby determining the volumetric flow of air through the upper housing 103. FIG. 5B depicts the controller 260 interpreting the current baffle geometry 503, the exhaust valve position 505 (determined independently of the controller 260's downstream determinations in the flow 500, in this embodiment) and the pressure differential 508 to determine the adjusted baffle geometry 513 and the status/warning message 514.

Referring specifically to FIG. 5A, the upper baffle actuator 311 measures an upper baffle position 501, according to one embodiment. The upper baffle position 501 may be measured as a rotational position of the upper baffle 301. In some embodiments, the upper baffle actuator 311 includes a motion sensing roller that uses an optical, mechanical, or electrical system to detect rotation of the upper baffle 301. The motion sensing roller may measure the angle and/or frequency of rotations, which may be used to determine the rotational movement (e.g., a starting rotational position, an ending rotational position, a rotational speed, etc.) of the upper baffle 301. In other embodiments, the actuator 311 may be a stepper motor, as suggested above in regards to FIG. 4, and include an electrical sensor. Rotation of the upper baffle 311 results in rotation a motor core included in the upper baffle actuator 311. The rotation of the motor core induces an electrical current in one or more electrical coils included in the upper baffle actuator 311. The electrical sensor detects the induced electrical current in the one or more electrical coils and provides a corresponding signal to indicate a rotational position of the upper baffle 301. A frequency of pulses of the induced current may also be used to indicate a speed at which the upper baffle 301 is rotating. The lower baffle actuator 312 may measure a lower baffle position 502 in a similar manner as the upper baffle actuator 311 measures the upper baffle position 501. The upper baffle position 501 and the lower baffle position 502 are communicated, via the upper baffle actuator 311 and the lower baffle actuator 312, to the controller 260. Together, the upper baffle position 501 and the lower baffle position 502 may form a current baffle geometry 503 describing a general geometry of the baffle assembly 105. Of course, the current upper baffle position 501 and the current lower baffle position 502 may simply be determined separately by the controller 260 without a determination of a generalized baffled geometry.

In some embodiments, the sash position sensor 230 measures a sash position 504, as described above in regards to FIG. 2. The sash position sensor 504 may communicate the measured sash position 504 to the controller 260.

In some embodiments, the first pressure sensor 220 determines the air pressure within the upper housing 103 and provides an interior pressure measurement 506. Similarly, the second pressure sensor 250 determines the air pressure in the room 102 and provides an exterior pressure measurement 507. A pressure differential 508 may be determined by comparing \the interior pressure measurement 506 and the exterior pressure measurement 507. Thus, the pressure differential 508 may be determined by, or provided to, the controller 260. In other embodiments, and as described above in regards to FIG. 2, a single differential pressure sensor may provide the controller 260 with a single differential pressure measurement that indicates the pressure differential 508.

In some embodiments, the controller 260 determines the updated baffle geometry 513 by receiving and interpreting the upper baffle position 501 and the lower baffle position 502. From the current baffle geometry 503, the controller 260 may determine a number of aerodynamic properties regarding airflow through the upper housing 103. For example, the controller 260 may be configured to predict various results that may occur in regards to a vortex formed by air flowing though the upper chamber 103, such as the vortex 320 depicted in FIGS. 3 and 4. As such, the controller 260 may be able to predict a relationship between various properties of the fume hood system indicative of volumetric air flow, such as the sash position 504, the pressure differential 508, and the speed at which the fan 113 rotates (thereby drawing air through the upper chamber 103). It should be appreciated by one skilled in the art that such predictive measures can be configured for the other inputs as shown. For example, the sash position 504 may be indicative of a potential face velocity traveling into the upper housing 103, and various predictive correlations may be outlined with respect to the remaining inputs of the flow 500, including the current baffle geometry 503 and the pressure differential 508. Similar predictive outlines may be configured for the pressure differential 508. In this sense, the controller 260 may be prepared to make dynamic adjustments to the system within the upper housing 103 regardless of the particular order or priorities at which the various inputs arrive. To illustrate, the controller 260 may first determine the current baffle geometry 503 (via the received measurements from the upper baffle actuator 311 and the lower baffle actuator 312), outline a predictive tree for interpretations of the remaining inputs (the sash position 504 and the pressure differential 508), determine the sash position 504, and re-outline the predictive tree for the oncoming determination of the pressure differential 508. If, at any point in the process of outlining such predictive determinations, the controller 260 makes a determination that no ensuing measures may be made to adjust the system within upper housing 103 to maintain safe conditions, the controller 260 may short-circuit the flow 500 to provide a status and/or warning message 514 to the user display 250 without further processing. In this sense, the controller 260 may be configured to alert a user of an unsafe condition at the earlies point possible, depending on the various timings of arriving inputs.

In some embodiments, once the controller 260 has received or determined the current baffle geometry 503, the sash position 504, and the pressure differential 508, the controller 260 may apply one or more processing circuits and memories to determine the updated baffle geometry 513, the exhaust valve position 505, and a status and/or warning message 514. Additionally, or as part of the determining the aforementioned outputs, the controller 260 may determine an overall state of containment within the upper housing 103. The second baffle geometry 513 and the exhaust valve position 505 may be determined to optimize the various properties of the airflow within the upper chamber 103. For example, the updated baffle geometry 513 and the exhaust valve position 505 may be calculated to ensure that the vortex 320 is articulated in a robust manner that is unlikely to be interrupted by dynamic changes to the operating environment within the upper housing 103. In some embodiments, the updated baffle geometry 513 is partitioned into an updated upper baffle position 511 to be provided to the upper baffle actuator 311 and a lower baffle position 512 to be provided to the lower baffle actuator 312. In other embodiments, and as suggested above, a generalized updated baffle geometry 513 may not be determined and the two separate determinations of updated baffle positions are immediately passed to the respective actuators. The status and/or warning message 514 may be displayed to a user via the user display 240 to indicate various operating parameters of the fume hood 101 including, but not limited, to, the interior pressure 506, the exterior pressure 507 and a face velocity. Further, the status and/or warning message 514 may communicate to the user a warning message identifying that containment is nearing unsafe conditions or an alert that containment is in an unsafe condition. In some embodiments, the user display 260 may provide a warning message or alert message until the various dynamic updates described herein result in safer conditions.

Referring specifically to FIG. 5B, the flow 500 is shown according to another embodiment. As shown, the exhaust valve position is received/determined by the controller 260 as an input rather than an output for determining updates to the system within the upper housing 103.

In some embodiments, the sash position sensor 230 may be coupled to an exhaust valve actuator 550, and the exhaust valve actuator 550 may be coupled to the exhaust valve 111. The exhaust valve actuator 550 may operate to move the exhaust valve 111 between various rotational positions between open and closed (e.g., between a position where air is freely traveling through the exhaust valve 111 and a position where air is completely blocked by the exhaust valve 111) to an exhaust valve position 505, and may further operate to determine a current rotational position of the exhaust valve 111. The exhaust valve actuator 550 may operate similar to the upper baffle actuator 311 as described above in regards to FIG. 4, or the exhaust valve actuator 550 may be a standard solenoid valve with a coupled sensor. As described above in regards to FIG. 1, the fan 113 creates a negative pressure in the ductwork 110. Accordingly, air flows out the upper housing 103, into the ductwork 110, and through the exhaust valve 111. In some embodiments, the fan 113 operates to create a constant negative pressure, and operation of an actuator, such as an exhaust valve actuator 550 described in regards to FIGS. 5A and 5B (thereby moving the exhaust valve 111 between various rotational positions) acts to control the volume of air being drawn from the fume hood 103.

In some arrangements, and as shown, the exhaust valve actuator 550 receives the sash position 504 from the sash position sensor 230 and controls the exhaust valve 111 independently of the controller 260. As suggested above, in a VAV system, the position of the sash is monitored, and the volumetric flow rate of air being drawn through the fume hood is adjusted in response. In cases where it is desirable ensure that the fume hood achieves safe containment primarily through achieving a target face velocity (e.g., 100 FPM), such an arrangement may be beneficial, as the exhaust valve 111 may be open or closed directly responsive to opening or closing of the sash 104. Thus, by calibrating the fan 113 to operate at a sufficient speed, the exhaust valve actuator may operate in direct communication with the sash position sensor 230 to move towards an open position in response to the sash 104 being raised (in order to increase face velocity through the opening 109) and move towards a closed position in response to the sash 104 being lowered (in order to decrease face velocity through the opening 109), thereby maintaining a consistent face velocity that meets safety requirements. However, in other arrangements, the exhaust valve actuator 550 is controlled by the controller 260 as described in regards to FIG. 5A above.

It should be noted that the flow 500 shown in FIGS. 5A and 5B may include any of the features discussed with respect to the other embodiments disclosed elsewhere herein, including the use of a single baffle, multiple exhaust valves, multiple interior pressure sensors, multiple reference pressure sensors, differing types of sensors, actuators, etc. Similarly, any of the features of FIGS. 5A and 5B may be incorporated into the other embodiments disclosed herein. All such combinations of features are to be understood to be within the scope of the present disclosure.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the upper baffle 301, shown as positioned in FIG. 4, may be incorporated in the fume hood that includes the lower baffle 302, shown as positioned in FIG. 3. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A fume hood control system for a fume hood comprising a first baffle, a sash and a hood enclosure positioned within an environment and comprising a plurality of sidewalls forming a work chamber, a first aperture configured to permit an airflow between the environment and the work chamber, and a second aperture configured to permit the airflow between the work chamber, the sash being configured to at least partially cover the first aperture, the first baffle being configured to direct a path of the airflow within the work chamber, the first baffle transitionable between a first plurality of positions, the fume hood control system, comprising:

an exhaust valve disposed in the fume hood transitionable between a second plurality of positions; and a controller configured to:

determine a current position of the exhaust valve;

determine one or more pressure measurements via a pressure sensor;

determine, via a sash sensor, a current position of the sash;

determine, via a baffle position sensor, a current position of the first baffle;

control operation of the first baffle to transition between the current position of the first baffle and an updated position of the first baffle in response to the current position of the sash, the current position of the first baffle, the one or more pressure measurements, and the current position of the exhaust valve; and control operation of the exhaust valve to selectively transition between the current position of the exhaust valve and an updated position of the exhaust valve based on the position of the sash.

2. The system of claim 1, wherein the controller is further configured to control the operation of the exhaust valve to transition between the current position of the exhaust valve and the updated position of the exhaust valve based on the one or more pressure measurements.

3. The system of claim 1, wherein the exhaust valve is coupled to one or more fans operable to draw the airflow from the environment, through the work chamber, and through the exhaust valve, such that transitioning the exhaust valve between the second plurality of positions results in one of an increase or a decrease in a volume of the airflow over a period of time.

4. The system of claim 1, further comprising a second baffle configured to further direct the path of the airflow within the work chamber, the second baffle transitionable between a third plurality of positions, wherein the controller is further configured to control the operation of the second baffle to transition between a current position of the second baffle and an updated position of the second baffle based on the current position of the sash, the current position of the first baffle, the current position of the second baffle, and the one or more pressure measurements.

5. The system of claim 1, further comprising a user interface comprising a memory and a processing circuit, the processing circuit configured to display a status of the work chamber to a user.

6. The system of claim 5, wherein the status of the work chamber indicates whether the one or more pressure measurements is within a threshold limit.

7. The system of claim 1, wherein airflow forms a vortex operable to contain a plurality of air particles within the work chamber.

8. The system of claim 7, wherein controlling the operation of the first baffle maintains the vortex in response to at least one of a change in pressure within the work chamber or a change in the current position of the sash.

9. A method of controlling a baffle of a fume hood, the method comprising:

determining, via a controller, a current position of a baffle and a current position of an exhaust valve;

measuring a current position of a sash with a sash sensor;

sending, via the sash sensor, the current position of the sash to the controller;

measuring a first pressure measurement within the fume hood with a first pressure sensor;

sending, via the first pressure sensor, the first pressure measurement to the controller;

measuring a second pressure measurement outside the fume hood with a second pressure sensor;

sending, via the second pressure sensor, the second pressure measurement to the controller;

controlling, via the controller, operation of the baffle to transition between the current position of the baffle and an updated position of the baffle based on the current position of the sash, the current position of the baffle, the first pressure measurement, and the second pressure measurement; and controlling, via the controller, operation of the exhaust valve to selectively transition between the current position of the exhaust valve and an updated position of the exhaust valve based on the position of the sash.

10. The method of claim 9, further comprising displaying, via a user interface comprising a memory and a processing circuit, a status of the fume hood to a user.

11. The method of claim 10, wherein the status of the fume hood indicates whether a calculated difference between the first pressure measurement and the second pressure measurement is within a threshold limit.

12. A controller for controlling a position of a baffle in a fume hood system, the controller comprising one or more processors and a memory, the one or more processors configured to:

determine a current position of an exhaust valve coupled to a fume hood;

determine, via a position sensor coupled to the controller, a current position of a sash coupled to the fume hood;

determine, via a first actuator coupled to the controller, a current position of a first baffle coupled to the fume hood, the first baffle coupled to the first actuator and configured to direct a path of airflow within the fume hood;

determine, via a differential pressure sensor coupled to the controller, a difference in pressure between a first pressure outside the fume hood and a second pressure within the fume hood; and control operation of the first baffle to transition between the current position of the first baffle and an updated position of the first baffle based on the current position of the first baffle, the difference in pressure, the current position of the exhaust valve; and control operation of the exhaust valve to transition between a current position of the exhaust valve and an updated position of the exhaust valve based on the current position of the sash.

13. The controller of claim 12, wherein the one or more processors are further configured to control the operation of the exhaust valve to transition between the current position of the exhaust valve and the updated position of the exhaust valve based on the difference in pressure.

14. The controller of claim 12, wherein the one or more processors are further configured to communicate the difference in pressure to a display device.

15. A controller for controlling a position of a baffle in a fume hood system, the controller comprising one or more processors and a memory, the one or more processors configured to:

determine, via a position sensor coupled to the controller, a current position of a sash coupled to a fume hood;

determine, via a first actuator coupled to the controller, a current position of a first baffle coupled to the fume hood, the first baffle coupled to the first actuator and configured to direct a path of airflow within the fume hood;

determine, via a differential pressure sensor coupled to the controller, a difference in pressure between a first pressure outside the fume hood and a second pressure within the fume hood; and control operation of the first baffle to transition between the current position of the first baffle and an updated position of the first baffle based on the current position of the first baffle, the difference in pressure;

determine, via a second actuator coupled to the controller, a current position of a second baffle coupled to the fume hood, the second baffle coupled to the second actuator and configured to further direct the path of airflow within the fume hood;

control operation of the first baffle based on the current position of the second baffle; and control operation of the second baffle to transition between the current position of the second baffle and an updated position of the second baffle based on the current position of the first baffle and the difference in pressure.

16. The controller of claim 12, wherein airflow forms a vortex operable to contain a plurality of air particles within the fume hood and controlling the operation of the first baffle maintains the vortex in response to at least one of a change in the difference in pressure or a change in a position of the sash.

17. The system of claim 1, wherein the controller is further configured to control the operation of the exhaust valve based on the position of the sash and the first baffle.

18. The system of claim 1, wherein the controller is further configured to control the operation of the exhaust valve based on the position of the sash and the one or more pressure measurements.

19. The method of claim 9, further comprising forming a vortex operable to contain a plurality of air particles within the work chamber.

20. The method of claim 9, wherein the exhaust valve is coupled to one or more fans operable to draw airflow from an environment, through the work chamber, and through the exhaust valve, such that transitioning the exhaust valve between the second plurality of positions results in one of an increase or a decrease in a volume of the airflow over a period of time.

* * * * *